Sept. 29, 1931.  E. CARRAINE  1,825,505
DISPLAY AND DECORATING DEVICE
Filed Dec. 20, 1929   4 Sheets-Sheet 1
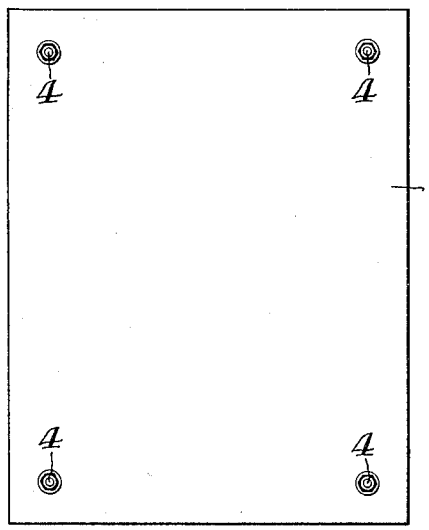
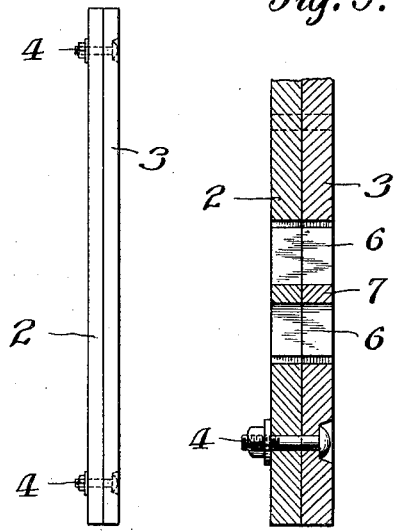
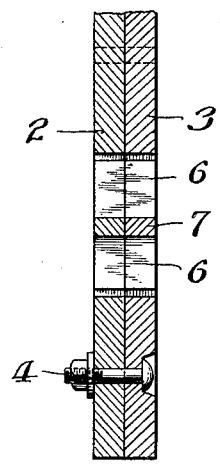
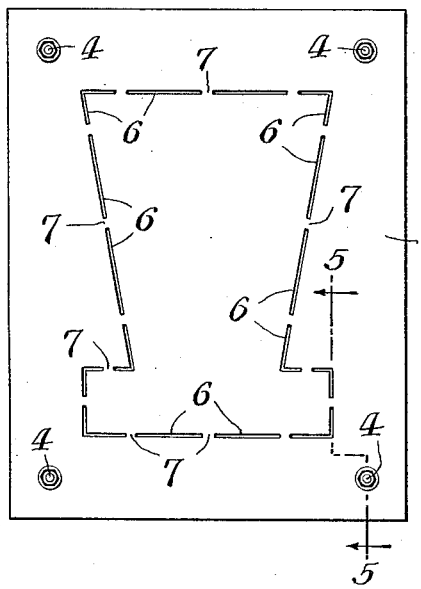
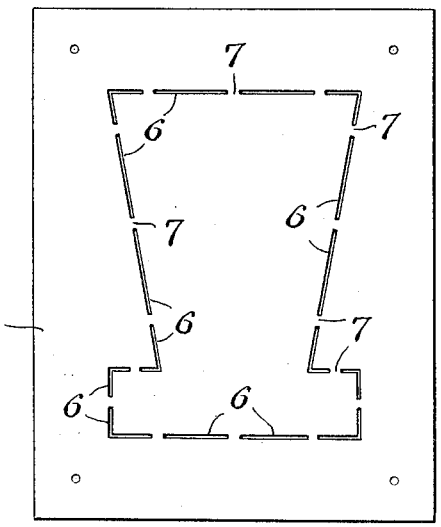

Sept. 29, 1931.  E. CARRAINE  1,825,505
DISPLAY AND DECORATING DEVICE
Filed Dec. 20, 1929  4 Sheets-Sheet 2
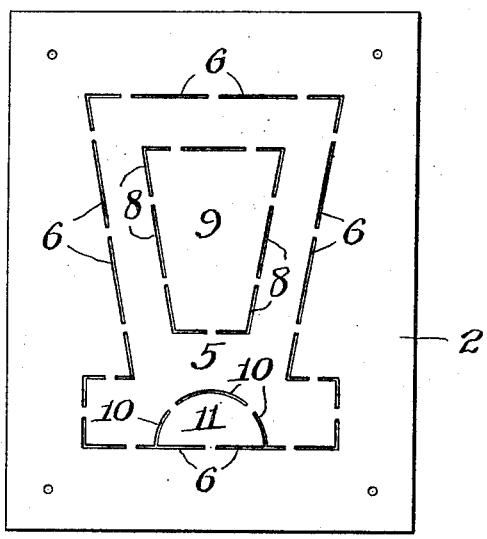
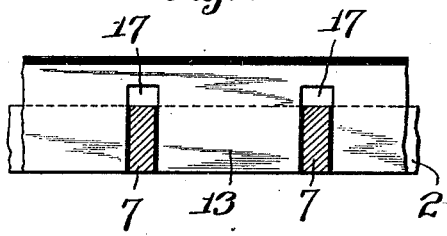
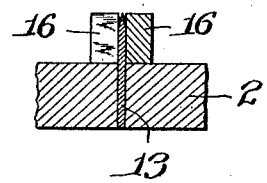
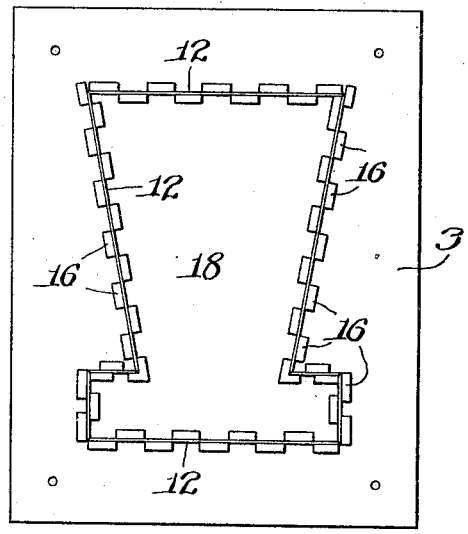
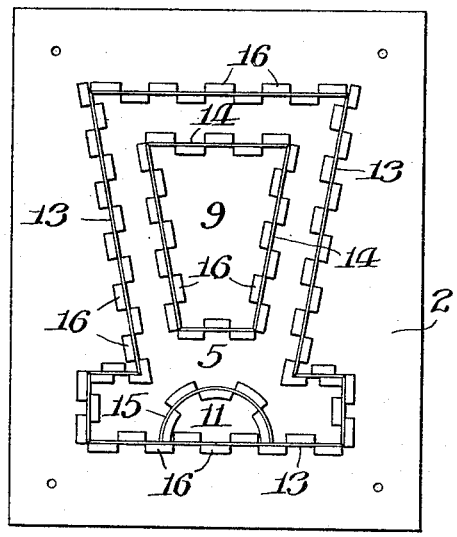
INVENTOR
Eugene Carraine
BY
ATTORNEY Sept. 29, 1931.    E. CARRAINE    1,825,505

DISPLAY AND DECORATING DEVICE

Filed Dec. 20, 1929    4 Sheets-Sheet 3

INVENTOR
Eugene Carraine
BY
ATTORNEY

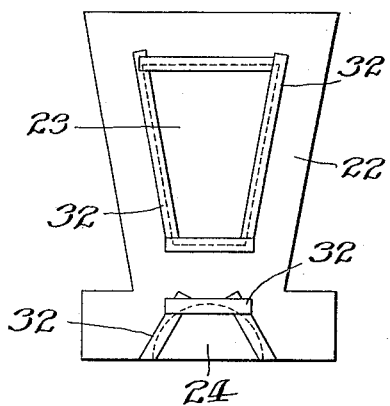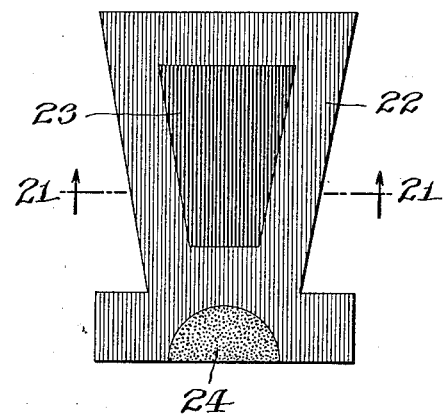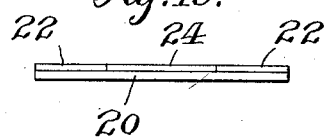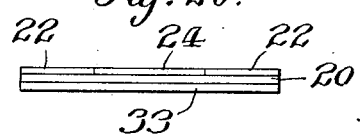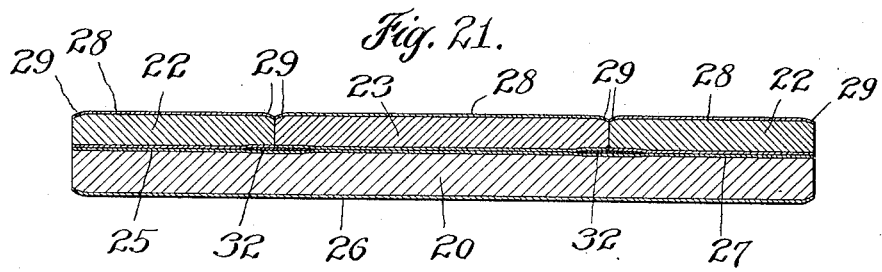

Patented Sept. 29, 1931

1,825,505

UNITED STATES PATENT OFFICE

EUGENE CARRAINE, OF PHILADELPHIA, PENNSYLVANIA

DISPLAY AND DECORATING DEVICE

Application filed December 20, 1929. Serial No. 415,442.

This invention relates to improvements in display and decorating devices.

An object of the invention is to provide a device of novel construction which may be made in the form of rich, attractive and highly artistic panels of various shapes, sizes and designs in which the areas forming the figures or parts of the designs may be made of elements whose forward or exposed surfaces differ as to character or color or both, and in which the said figures or parts are in the form of inlaid work secured upon a suitable backing element.

The invention resides in the elements and the combinations of them of my improved device hereinafter described and claimed.

In the accompanying drawings, illustrating the invention,

Figure 1 is a face view of two boards secured together for the making of dies for use in producing a display and decorating device embodying my invention.

Figure 2 is an edge view of the boards shown in Fig. 1.

Figure 3 is a face view of the boards shown in Fig. 1, after the outline openings of a design have been sawed therethrough.

Figure 4 is a face view of one of the boards shown in Fig. 3, detached from the other board shown therein.

Figure 5 is a sectional detail through a portion of the boards shown in Fig. 3, on line 5—5 of Fig. 3.

Figure 6 is a face view of one of the boards, as shown in Fig. 4, after outline openings of design areas or figures have been sawed therethrough within the outline openings shown in Fig. 4.

Figure 7 is a face view of one of the boards, as shown in Fig. 4, having a cutting knife inserted into the outline openings therein and having yieldable pads mounted thereon adjacent to the knife, the whole forming a complete cutting die.

Figure 8 is a face view of the board shown in Fig. 6, having cutting knives inserted into the outline openings therein and into the openings within the area surrounded by the outline opening and having yieldable pads mounted thereon adjacent to the knives, the whole forming a complete cutting die.

Figure 9 is a longitudinal section through a portion of the board of one of the cutting dies, showing a portion of one of the cutting knives in one of the openings of the board.

Figure 10 is a section through a portion of the board of one of the cutting dies, transversely of one of the cutting knives, showing the knife in one of the openings in the board and showing the yieldable pads on the respective sides of the knife.

Figure 12:
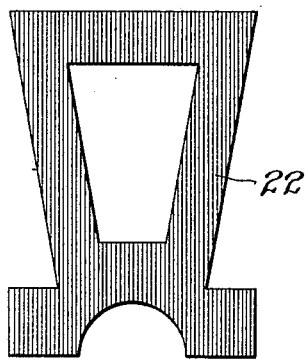
Figure 13:
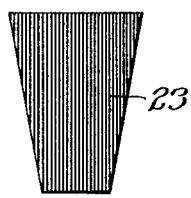
Figure 14:

Figures 12, 13, and 14, are face views of pieces of pasteboard having different forward surface characteristics cut from different stock by the die shown in Fig. 8.

Figure 15:
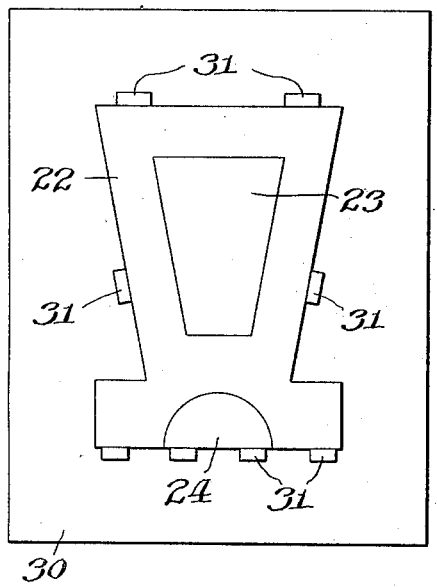

Figure 15 is a top view of an assembling table having the parts shown in Figs. 12, 13 and 14 inverted and assembled thereon.

Figure 16:
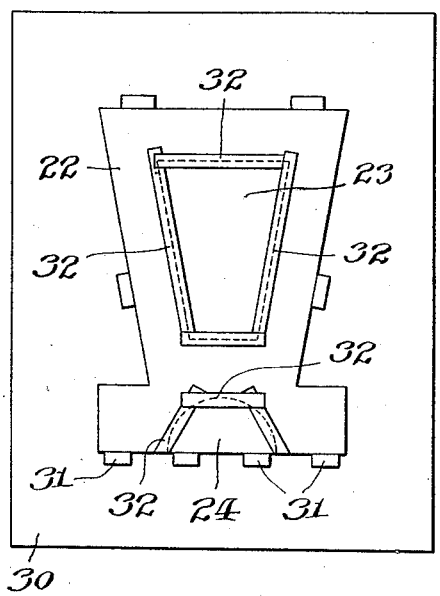

Figure 16 is a view of the table and parts shown in Fig. 15, after connecting strips of paper have been secured to the adjacent edge portions of the back thereof.

Figure 17 is a view of the connected parts shown in Fig. 16, removed from the table shown therein.

Figure 11:
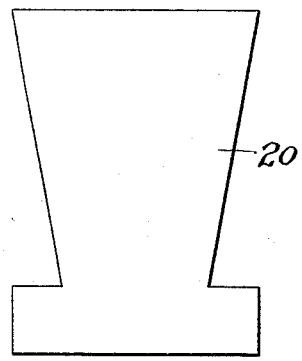
Figure 11 is a face view of a piece of pasteboard cut from stock by the die shown in Fig. 7.

Figure 18 is a face view of the assembled and connected parts shown in Fig. 17 after the same have been secured upon the backing sheet shown in Fig. 11, showing the parts reversed and presenting the forward or front face of the connected parts shown in Fig. 17, and showing a complete display and decorating device embodying my invention.

Figure 19 is a bottom edge view of the parts shown in Fig. 18.

Figure 20 is a view similar to Fig. 19, including an additional backing sheet secured to back of the assembled parts.

Figure 21 is a section through the device, enlarged, on line 21—21 of Fig. 18.

In carrying out my invention in connection with the production of the display and decorating device shown in Figs. 18, 19 and 21, I take two boards 2 and 3 and secure them together in the regions of the corners thereof by suitable bolts 4, as shown in Figs. 1 and 2.

I then saw alined openings 6 through the two boards at the same time, such openings following the outline of the device shown in Fig. 18 and forming a substantially continuous line interrupted at intervals by unsawed parts 7 which are left intact to hold the parts of the boards together and prevent the separation of the parts thereof surrounded by the line of openings 6 from the outer parts of the boards.

The construction of the boards is the same as that of those usually employed in the art of making pasteboard cutting dies, as well known in the art, and the sawing of the openings 6 in the two boards is done in one operation so that after the operation and the removal of the bolts 4 and the separation of the boards 2 and 3, I will have two boards in which the openings 6 are exact duplicates of each other, each being as shown in Fig. 4.

Having produced two boards with duplicate outline openings 6 therein, as shown in Fig. 4, I take one of these boards 3 and saw through the same alined openings 8 which enclose an area 9 within the area enclosed by the outline openings 6, and I also saw through the same, alined openings 10 which, with parts of the outline openings 6, enclose an area 11 within the area enclosed by the outline openings 6, as shown in Fig. 6.

I now have two boards 2 and 3, one 2 of which is provided with only the outline openings 6 therein, as shown in Fig. 4, and one 3 of which is provided with the outline opening 6 and the inner openings 8 and 10 enclosed by the outline openings 6, as shown in Fig. 6. From these two boards shown in Figs. 2 and 3 I construct two pasteboard cutting dies, as shown in Figs. 7 and 8, respectively, by inserting cutting knives 12 and 13 in the outline openings 6, respectively, of the two boards 2 and 3 shown in Figs. 4 and 5, and by inserting cutting knives 14 and 15 in the openings 8 and 10 of the board 3, as shown in Fig. 8, by securing to the two boards, at intervals along the respective sides of the knives 12, 13, 14 and 15 therein, yieldable pads 16 constructed of soft or spongy rubber.

The cutting knives 12, 13, 14 and 15 project beyond the surfaces of the boards 2 and 3 of the dies, and they are provided with openings or cut-outs 17 (Fig. 9) to receive and straddle the unsawed parts 7 of the boards and to extend continuously around the areas 5, 9, 11 and 18 which they enclose.

The projecting edge portions of the cutting knives 12, 13, 14 and 15 of the two dies shown in Figs. 7 and 8 are sharpened as shown in Figs. 9 and 10, and the dies are adapted to be operated in a suitable press to cut from sheets of pasteboard or other material pieces whose shapes correspond in outline with the areas 5, 9, 11 and 18, enclosed by the knives 12, 13, 14, and 15, in the manner well known in this art.

Before the two boards 2 and 3 shown in Figs. 1 and 2 are sawed, lines corresponding with outlines of the areas 5, 9, 11 and 18 enclosed by the cutting knives 12, 13, 14 and 15 are marked upon the top board 2 for guidance in sawing the openings 6 through the two boards 2 and 3, and, thereafter, the marked top board 2 is used for the production of the die board 2 shown in Fig. 6, the marks thereon serving as guides for sawing the openings 8 and 10 therein.

I shall now describe the display and decorating device shown in Figs. 18, 19 and 21 constituting my improved article of manufacture and I shall then describe the art or method of producing the same with the aid of the two dies shown in Figs. 7 and 8.

The device comprises a backing sheet 20 formed of pasteboard and front members 22, 23 and 24 formed of sheets of pasteboard and secured upon the forward surface of the backing sheet 20.

The front members 22, 23 and 24 cover the entire forward surface of the backing sheet 20 and they are secured thereon in the same plane in the form of inlaid work.

The forward and rearward surfaces of the pasteboard backing sheet 20 have sheets of paper 25 and 26, respectively, glued or otherwise suitably secured thereto to prevent warping thereof. The rearward surfaces of the pasteboard front members 22, 23 and 24 have sheets of paper 27 secured thereto, and the forward surfaces of the front members 22, 23 and 24 have sheets of paper or other material 28 secured thereto for display or ornamental purposes and for cooperation with the sheets 27, to prevent warping of the front members.

The device may be constructed with an outline of any desired shape or contour for its intended purpose and any desired number of front members of any desired shape and size within the outline of the backing sheet may be secured upon the backing sheet to produce the desired design or effect in the finished article.

When the front members 22, 23 and 24 are assembled on the backing sheet 20, they cover the entire forward surface thereof and the outline of the assembled members conforms with the outline of the backing sheet in registry therewith.

The sheets of paper or other material 28, forming the forward surfaces of the members 22, 23 and 24 may each be of a color contrasting with the colors of the others, and some or all may be of a character which is in imitation of leather or metal or other material in accordance with the effect desired to be produced.

The surrounding edge portions of the front members 22, 23 and 24 are beveled, as shown in Fig. 21, at 29, and this is an important feature, as these beveled edges receive and reflect high lights and add richness and beauty to the entire article.

In producing the device shown in Figs. 18, 19 and 21 with the aid of the two dies 2 and 3 shown in Figs. 7 and 8, I proceed as follows:

I make up or prepare sheets of pasteboard having the characteristics of pasteboard forming the backing sheet 20 and forming the front members 22, 23 and 24 of the device but of larger areas than the areas of such backing sheet 20 and members 22, 23 and 24. I then place the die 3 in a suitable press and place the sheet of pasteboard previously prepared for making the backing sheet 20 of the device beneath the die and I operate the press to force the die through the sheet of pasteboard and thereby cut therefrom the backing sheet 20, shown in Fig. 11, whose outline conforms with the outline of the area 18 surrounded by the cutting knife 12. I then place the die 2 in a press and place the sheet of pasteboard previously prepared for making the front member 22 of the device beneath the area 5 of the die with the sheet of paper secured thereon which is to form the forward surface of member 22 uppermost or facing the cutting knives of the die and I operate the press to force the die through the sheet of pasteboard and thereby cut therefrom the front member 22 (Fig. 12) of the device whose outline conforms with that of the area 5 surrounded by the knives 13 and 15 and whose central area has a cut-out portion corresponding with the area 9 surrounded by the knives 14 of the die 2. I then place the same die 2 in a press, and place the sheet of pasteboard previously prepared for making the front member 23 of the device beneath the area 9 of the die with the sheet of paper secured thereon which is to form the forward surface of the member 23 uppermost or facing the cutting knives of the die 2, and I operate the press to force the die through the sheet of pasteboard and thereby cut therefrom the front member 23 (Fig. 13) whose outline conforms with that of the area 9 of the die surrounded by the knives 14. I then place the same die 2 in a press and place the sheet of pasteboard previously prepared for making the front member 24 of the device beneath the area 11 of the die with the sheet of paper secured thereon which is to form the forward surface of the member uppermost or facing the cutting knives of the die, and I operate the press to force the die through the sheet of pasteboard and thereby cut therefrom the front member 24 (Fig. 14) whose outline conforms with that of the area 11 of the die surrounded by the knives 13 and 15.

I now assemble the three front members 22, 23 and 24, shown in Figs. 12, 13 and 14, on a suitable assembling table 30, by inverting the members or turning the forward surfaces thereof downwardly and placing them flat upon the table 30 with the members 23 and 24 in their corresponding openings in the member 22, as shown in Fig. 15. The table 30 is provided with suitable upwardly projecting fixed blocks 31 for engagement with outer edge portions of the assembled members to retain them in place upon the table and to hold the members in proper relative position.

After the members 22, 23 and 24 have been assembled on the table 30, as shown in Fig. 15, I apply moistened strips of gummed paper 32 to the adjacent meeting edge portions of the members, as shown in Fig. 16, so that the paper strips will cross the joints between the members and thereby serve to connect them together and hold them in proper relative positions for subsequent handling in completing the finished device. As the moistened strips of paper 32 dry after being applied to the members 22, 23 and 24, the strips 32 adhere to the members and contract and draw the adjoining edge portions thereof into close contact with each other.

The assembled member 22, 23 and 24 with the paper strips 32 connecting them are now removed from the table and appear as shown in Fig. 17. I now apply a coating of glue or other suitable adhesive to the back of the assembled and connected member, as shown in Fig. 17, and place the backing sheet 20, shown in Fig. 11, upon the glue coating with the edge portion of the backing sheet 20 in exact registry with the outer edge portions of the assembled members; and I then place the assembled members with the packing sheet thereon in a suitable press and operate the press to press the members and backing sheet firmly together while the glue between them dries and secures them together. This completes the operation of producing the device which when removed from the press appears as shown in Figs. 18, 19 and 20.

If desired, the coating of glue can be applied to the assembled and connected members 22, 23 and 24 before they are removed from the assembling table 30; and, instead of applying the coating of glue to the back of the assembled members it may be applied to the backing sheet 20 before bringing the members and backing sheet together.

If it is desired to increase the stiffness of the device one or more additional backing sheets, like the one shown in Fig. 11 and indicated at 33 in Fig. 20, may be glued or otherwise secured to the backing sheet first applied to the assembled members.

The entire surrounding edge portions of the members 22, 23 and 24 and the edge portion of the member 22 around the opening therein in which the member 23 is located are beveled, as shown in Fig. 21. This beveling is produced by the cutting knives of the dies 2 and 3 are the knives are forced through the pieces or sheets of pasteboard from which the members are cut. The beveling of the members is an important feature in the finished articles because it presents surfaces at angles to the plane of the main bodies of the members which reflect a different light from that reflected by the main bodies of the members and thereby add richness and beauty to the appearance of the finished device.

By making the two dies 2 and 3 as hereinbefore described and using them as herein set forth, I am enabled to produce, in an inexpensive manner, display devices of elaborate and varying designs in which the outlines of the assembled front members will be exact duplicates of the outlines of the backing sheets to which they are secured and in which the edge portions of each front member which meets an opposing edge portion of another front member is an exact counterpart of such opposing edge portion, so that the entire set of members of each design when assembled and secured upon the backing sheet will not only have the outline thereof conforming exactly to the outline of the back sheet, but will also have the meeting and opposing edge portions thereof in close relationship and fitted to each other with exactness.

I have illustrated and described herein a display and decorating device of comparatively simple character having few parts but it will be readily understood that its outline may be varied and elaborated to conform to the outline of any desired figure or design, and also that the front members secured upon the backing sheet may be greatly increased in number and the outlines thereof greatly varied for the production of displays of intricate and elaborate design.

It will be understood also that my invention enables me to use many different kinds of sheets of paper or other material of rich and varied character for the formation of the forward sheets or surfaces of the front members of the device, and thereby produce many different designs and effects made up of different associated areas covered by such sheets of paper or other material.

I claim as my invention:

1. An article of manufacture comprising a pasteboard backing sheet, a front sheet secured upon the backing sheet and having an opening cut therein, and an insert secured upon the backing sheet within and closely fitting the walls of the opening in the front sheet, said front sheet comprising a pasteboard body having a sheet of paper secured to the rearward surface thereof, and a sheet of paper secured to the forward surface thereof, and said insert comprising a pasteboard body having a sheet of paper secured to the rearward surface thereof and a sheet of paper secured to the forward surface thereof.

2. An article of manufacture comprising a pasteboard backing sheet, a front sheet secured upon the backing sheet and having an opening cut therein, and an insert secured upon the backing sheet within and closely fitting the walls of the opening in the front sheet, said front sheet comprising a pasteboard body having a sheet of paper secured to the rearward surface thereof and a sheet of paper secured to the forward surface thereof, said insert comprising a pasteboard body having a sheet of paper secured to the rearward surface thereof and a sheet of paper secured to the forward surface thereof and the outer surfaces of said front sheet and said insert having their adjacent edge portions beveled.

3. An article of manufacture comprising a backing sheet, a front sheet secured upon the backing sheet and having an opening cut therein, and an insert secured upon the backing sheet within and closely fitting the walls of the opening in the front sheet, said backing sheet comprising a pasteboard body having a sheet of paper secured to the rearward surface thereof and a sheet of paper secured to the forward surface thereof, said front sheet comprising a pasteboard body having a sheet of paper secured to the rearward surface thereof and a sheet of paper secured to the forward surface thereof, and said insert comprising a pasteboard body having a sheet of paper secured to the rearward surface thereof and a sheet of paper secured to the forward surface thereof.

4. An article of manufacture comprising a pasteboard backing sheet, a pasteboard front sheet secured upon the backing sheet and having an opening cut therein, a pasteboard insert secured upon the backing sheet within and closely fitting the walls of the opening in the front sheet and a strip of paper interposed between and secured to the forward surface of the backing sheet and the rearward surface of the front sheet and the insert and crossing the joint between the front sheet and the insert.

In testimony whereof I affix my signature.

EUGENE CARRAINE.